(12) United States Patent
Hirata et al.

(10) Patent No.: US 8,481,610 B2
(45) Date of Patent: Jul. 9, 2013

(54) METHOD OF MANUFACTURING PUNCTURE-SEALING AGENT

(75) Inventors: Narukuni Hirata, Kodaira (JP); Shinichi Eguchi, Kodaira (JP); Minoshima Haruki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 169 days.

(21) Appl. No.: 13/125,712

(22) PCT Filed: Oct. 22, 2009

(86) PCT No.: PCT/JP2009/068177
§ 371 (c)(1), (2), (4) Date: May 5, 2011

(87) PCT Pub. No.: WO2010/047368
PCT Pub. Date: Apr. 29, 2010

(65) Prior Publication Data
US 2011/0207848 A1 Aug. 25, 2011

(30) Foreign Application Priority Data
Oct. 24, 2008 (JP) .................. 2008-274151

(51) Int. Cl.
*B29C 73/00* (2006.01)

(52) U.S. Cl.
USPC ........................................ 523/166

(58) Field of Classification Search
USPC ........................................ 523/166
See application file for complete search history.

(56) References Cited

U.S. PATENT DOCUMENTS
2003/0050365 A1 3/2003 Kishida et al.

FOREIGN PATENT DOCUMENTS
JP 2003-193029 A 7/2003
JP 2003-193030 A 7/2003
WO 2008/032765 A1 3/2008

*Primary Examiner* — Edward Cain
(74) *Attorney, Agent, or Firm* — Sughrue Mion, PLLC

(57) ABSTRACT

A method for manufacturing a puncture-sealing agent, which effectively prevents gelification of the puncture-sealing agent caused by agglomerates of rubber latex and that can enhance the productivity of the puncture-sealing agent is provided. The manufacturing method includes a first mixing process of mixing an antifreeze liquid with water to obtain a mixture liquid A1; a second mixing process of adding the mixture liquid A1 dropwise into a rubber latex that is being stirred and performing mixing to obtain a mixture liquid A2, while increasing the stirring speed as a liquid amount of the mixture liquid A2 increases; and a third mixing process of mixing the mixture liquid A2 with a tackifier. An amount of variation in the stirring speed is preferably from 0.1 rpm/mm to 6.0 rpm/mm, and a dropwise-addition rate of the mixture liquid A1 is preferably from 0.5 kg/min to 500 kg/min.

7 Claims, 3 Drawing Sheets

METHOD OF MANUFACTURING PUNCTURE-SEALING AGENT

CROSS REFERENCE TO RELATED APPLICATIONS

This application is a National Stage of International Application No. PCT/JP2009/068177 filed Oct. 22, 2009, claiming priority based on Japanese Patent Application No. 2008-274151 filed Oct. 24, 2008, the contents of all of which are incorporated herein by reference in their entirety.

TECHNICAL FIELD

The present invention relates to a method of manufacturing a puncture-sealing agent.

BACKGROUND ART

A puncture-sealing agent, which is a repair agent for sealing the site of a puncture when a puncture occurs, is required to have (1) puncture-sealability for sealing a puncture of a punctured tire, which is a primary function of the puncture-sealing agent; (2) ease of injectability, in terms of decreasing the viscosity of the puncture-sealing agent and facilitating injection of the puncture-sealing agent through a valve or the like; (3) a certain degree of non-freezability enabling use even in a low temperature environment; (4) storage stability enabling long-term storage; and the like.

It is common to manufacture a puncture-sealing agent by mixing and stirring the components that form the puncture-sealing agent. However, such a method has a problem in that rubber particles in a latex agglomerate, whereby the solution is changed to a cream or gel state or the like and is thereby destabilized. With regard to this kind of problem, various suggestions have been made. For example, a manufacturing method exists which focuses on the mixing order of the respective components to be mixed. Specifically, for example, a method for manufacturing a puncture-sealing agent has been disclosed that includes: a first mixing process of mixing an antifreeze liquid and water; a second mixing process of mixing, with a rubber latex, a mixture liquid obtained by the first mixing process; and a third mixing process of mixing, with a tackifier, a mixture liquid obtained by the second mixing process (see, for example, WO 2008/032765) in order to effectively prevent gelification of the sealing agent caused by agglomerates of rubber latex.

Furthermore, methods of manufacturing a puncture-sealing agent have been also disclosed that focus on the mixture method of respective components. Examples of such a method include a method of manufacturing a puncture-sealing agent for a tire including injecting an antifreeze liquid at an injection rate of from 5 to 20 liters/min, to a rubber latex containing a tackifier while the mixture is stirred at a rotation speed of from 30 to 400 rpm, in order to greatly suppress the formation of a rubber agglomerate (see, for example, Japanese Patent Application Laid-Open (JP-A) No. 2003-193029, or JP-A No. 2003-193030).

SUMMARY OF INVENTION

Technical Problem

However, in the manufacturing methods described above, although puncture-sealing agents with a stable liquid state can be manufactured by suppressing generation of rubber agglomerates and the like, the productivity of the puncture-sealing agent is insufficient.

Under such circumstances, an object of the present invention is to provide a method of manufacturing a puncture-sealing agent which effectively prevents gelification of the puncture-sealing agent caused by agglomerates of rubber latex, and which can enhance the productivity of the puncture-sealing agent.

Solution to Problem

As a result of extensive investigations, the inventors of the present invention have found that the object can be achieved by the invention described below.

That is, according to an aspect of the invention, there is provided a method of manufacturing a puncture-sealing agent, the method including: a first mixing process of mixing an antifreeze liquid with water to obtain a mixture liquid A1; a second mixing process of adding the mixture liquid A1 dropwise into a rubber latex that is being stirred and performing mixing to obtain a mixture liquid A2, while increasing stirring speed as a liquid amount of the mixture liquid A2 increases; and a third mixing process of mixing the mixture liquid A2 with a tackifier.

An amount of variation in the stirring speed during the second mixing process is preferably from 0.1 rpm/mm to 6.0 rpm/mm.

A dropwise-addition rate of the mixture liquid A1 is preferably from 0.5 kg/min to 500 kg/min.

When an amount of the antifreeze liquid is a and an amount of water is b, a ratio a/b is preferably from 0.05 to 9.0 in mass ratio.

Advantageous Effects of Invention

According to an aspect of the present invention, a method of manufacturing a puncture-sealing agent can be provided that effectively prevents gelification of the puncture-sealing agent caused by agglomerates of rubber latex and that can enhance the productivity of the puncture-sealing agent.

DESCRIPTION OF EMBODIMENTS

Method of Manufacturing Puncture-Sealing Agent

Figure 1:
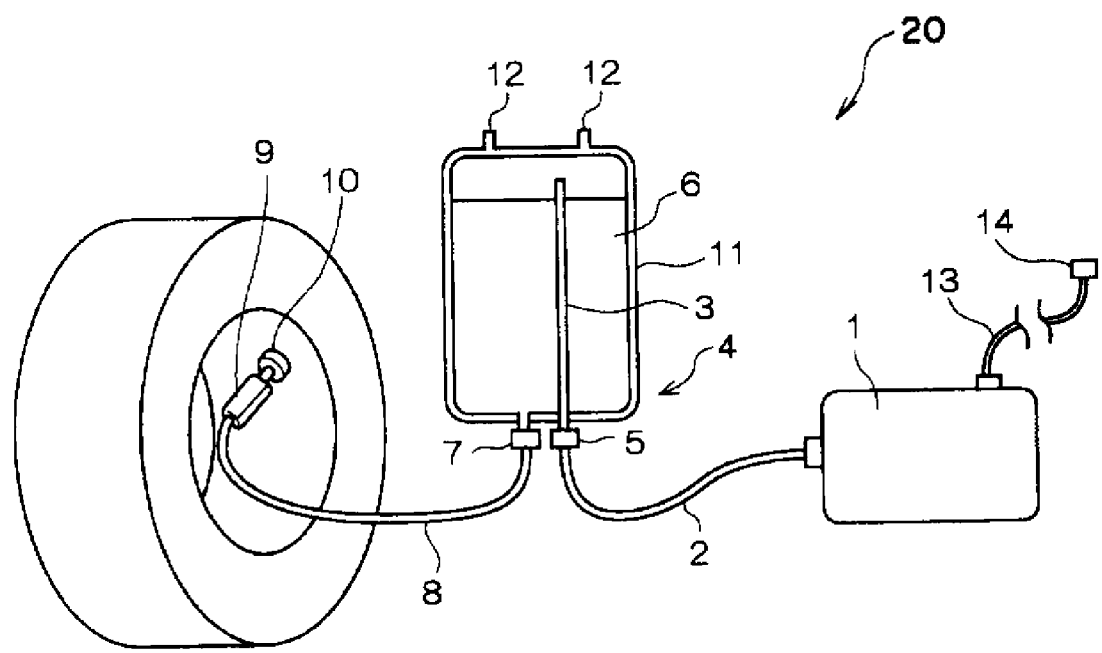
FIG. 1 is a schematic diagram showing an example of a sealing-and-pump-up device used to fill a tire with a puncture-sealing agent according to an exemplary embodiment of the present invention.

A method of manufacturing a puncture-sealing agent of the present invention includes: a first mixing process of mixing an antifreeze liquid with water to obtain a mixture liquid A1; a second mixing process of adding the mixture liquid A1 dropwise into a rubber latex that is being stirred and performing mixing to obtain a mixture liquid A2, while increasing stirring speed as a liquid amount of the mixture liquid A2 increases; and a third mixing process of mixing the mixture liquid A2 with a tackifier.

The method of manufacturing a puncture-sealing agent above is referred to as a first exemplary embodiment of the invention.

When an antifreeze liquid is added dropwise into a rubber latex, destabilization of the rubber latex tends to occur. Therefore, in the method of manufacturing a puncture-sealing agent of the invention, destabilization of the rubber latex when mixing of the rubber latex with an antifreeze liquid can be suppressed by diluting the antifreeze liquid with water in advance and performing dropwise addition thereof to the rubber latex.

Furthermore, in the case of dropwise addition and mixing of an antifreeze liquid into a rubber latex which is being stirred, in a state in which the amount of liquid is small when mixing of the rubber latex and the antifreeze liquid has been just started, when the stirring speed of the mixture liquid is high, the mixture liquid foams, which tends to cause gelification of the rubber latex. Therefore, it is necessary to make the stirring speed low when the liquid amount of the mixture liquid is small. However, at a stage when the liquid amount of the mixture liquid has increased, when the initial stirring speed is retained, stirring is insufficient, and it is difficult to obtain satisfactory productivity.

Therefore, as in the method of manufacturing a puncture-sealing agent described above, by stirring the mixture liquid A2 containing the rubber latex and the antifreeze liquid while the stirring speed is varied with specific values, that is, by variably increasing the stirring speed over time, foaming of the mixture liquid A2 at a stage in which the liquid amount of the mixture liquid A2 is small is suppressed (that is, gelification of the rubber latex is suppressed), foaming tends not to occur as the liquid amount of the mixture liquid A2 increases, and the productivity of the puncture-sealing agent can be increased by increasing the stirring speed.

The amount of variation in the stirring speed is preferably from 0.1 rpm/mm to 6.0 rpm/mm.

Hereinafter, the first exemplary embodiment of the invention is described in terms of the respective processes.

(1) First Mixing Process

The first mixing process is a process of mixing an antifreeze liquid with water to obtain a mixture liquid A1. When the amount of the antifreeze liquid is a and the amount of water is b, the mixture mass ratio of the antifreeze liquid and the water (a/b) is preferably from 0.05 to 9.0. When mixing is performed, it is preferable to carry out stirring, and the stirring speed is preferably from 50 rpm to 500 rpm.

Here, the antifreeze liquid are not particularly limited as long as the antifreeze liquid has a function of preventing freezing of the puncture-sealing agent when being used in cold places.

As an example of the antifreeze liquid, a monohydric alcohol or a dihydric alcohol may be used, and specific examples thereof include ethanol, 1-propanol, ethylene glycol, and propylene glycol. The alcohols described above may be straight-chained, branched or cyclic, and among others, a monohydric or dihydric alcohol having a carbon number of 1 to 5 is preferred from the viewpoint of reducing the viscosity of the puncture-sealing agent.

The content of the antifreeze liquid is not particularly limited, however from the viewpoint of the antifreezing property at low temperature, the content of the antifreeze liquid is preferably from 5% by mass to 90% by mass, and more preferably from 10% by mass to 50% by mass, with respect to the total mass of the puncture-sealing agent. When the content of the antifreeze liquid is less than 5% by mass, the antifreezing property at low temperature is not sufficiently obtained in some cases, and when the content is greater than 90% by mass, the relative amount of the rubber latex decreases, and therefore, sufficient sealing characteristics is not obtained in some cases.

(2) Second Mixing Process

The second mixing process is a process of adding dropwise the mixture liquid A1 into a rubber latex that is being stirred, to mix them and obtain a mixture liquid A2, while increasing stirring speed as a increase in the liquid amount of the mixture liquid A2 increases.

The example of the exemplary embodiment of "increasing stirring speed as a liquid amount of the mixture liquid A2 increases" is, for example, an exemplary embodiment in which the stirring speed of the mixture liquid A2 is increased every increase in the volume [ml] of the mixture liquid A2, or every increase in the liquid depth [mm] of the mixture liquid A2.

Here, the term "liquid depth" refers to the distance (mm) from a bottom surface of a container holding a liquid to a liquid surface when the liquid is in a static state in which the liquid is not stirred or the like or is not undulating. Further, the container used in the definition of the "liquid depth" refers to a container in which a bottom surface of the container is not a form of semispherical, convex or concave and which has a flat bottom surface in which the liquid surface and the bottom surface of the container are parallel to each other when a liquid is placed in the container.

It is preferable that the amount of variation in the stirring speed of the mixture liquid A2 is constant. For example, in the case where the amount of variation in the stirring speed of the mixture liquid A2 is set at 1 rpm/ml, when the volume of the mixture liquid A2 is 1 ml, the stirring speed is set at 1 rpm, and when the volume of the mixture liquid A2 is 3 ml, the stirring speed is set at 3 rpm.

The stirring speed of the mixture liquid A2 may be increased as needed as a liquid amount of the mixture liquid A2 increases, or may be increased fixed volume increments or fixed liquid depth increments.

Among other things, the amount of variation in the stirring speed of the mixture liquid A2 is preferably set from the viewpoint of the liquid depth [mm] of the mixture liquid A2, and is preferably in the range of from 0.1 rpm/mm to 6.0 rpm/mm.

In the invention, the stirring speed of the mixture liquid A2 is increased in accordance with the liquid amount of the mixture liquid A2, in order to improve the productivity of the puncture sealing agent, and/or to suppress foaming of the mixture liquid A2. However, when the liquid amount of the mixture liquid A2 is large but the stirring speed is too high, the rotation of a stirrer is in a so-called idling state, and stirring is inefficiently performed in some cases. When the upper limit of the amount of variation in the stirring speed of the mixture liquid A2 is 6.0 rpm/mm, foaming of the mixture liquid A2 can be further suppressed at the time when the liquid amount of the mixture liquid A2 is small, and when the liquid amount of the mixture liquid A2 is increased and the stirring speed is increased, idling of the stirrer can be prevented.

Furthermore, when the stirring speed of the mixture liquid A2 is 0.1 rpm/mm or higher, mixing of the mixture liquid A1 and the latex can be sufficiently performed.

As such, according to the invention, it is necessary to increase the stirring speed in accordance with the increase in the liquid amount of the mixture liquid A2 by changing the stirring speed of the mixture liquid A2.

The amount of variation in the stirring speed of the mixture liquid A2 is more preferably from 0.2 rpm/mm to 1.5 rpm/mm.

Here, in the second mixing process, it is preferable to use a container and a stirrer, of which the relationship between the size of the container that holds the rubber latex (in a state in which the mixture liquid A1 has not been added dropwise) or the mixture liquid A2, and the diameter of the stirring blade of the stirrer has the following relationship. That is, in the case of container being a cylinder, when the diameter of the bottom surface is G mm and the diameter of the stirring blade is H mm, the relationship is that H/G is from 0.1 to 0.4.

When the rubber latex is stirred in the container described above using the stirrer that is in such a relationship, efficient stirring can be carried out.

The rate of dropwise addition of the mixture liquid A1 is preferably from 0.5 kg/min to 500 kg/min.

By regulating the rate of dropwise addition of the mixture liquid A1 and regulating the stirring speed of the mixture liquid A2 in the range described above, destabilization of the rubber latex which tends to occur when the mixture liquid A1 containing an antifreeze liquid is added dropwise into the rubber latex can be suppressed, and a further improvement of the productivity of the puncture-sealing agent can be expected. That is, in the phase in which the liquid amount of the mixture liquid A2 is small, the mixture liquid A1 is added in a small amount to prevent foaming, and by the time the liquid amount of the mixture liquid A2 increases and foaming does not tend to occur, the productivity of the puncture-sealing agent is further improved by increase the amount of dropwise addition of the mixture liquid A1.

The rate of dropwise addition of the mixture liquid A1 is more preferably from 0.5 kg/min to 100 kg/min, from the viewpoint of preventing destabilization of the rubber latex.

Here, the type of the rubber latex is not particularly limited, and for example, a natural rubber (NR) latex, a synthetic rubber latex, or a synthetic resin latex can be appropriately selected and used.

Examples of the synthetic rubber latex include SBR (styrene-butadiene rubber) latex, NBR (nitrile rubber) latex, MBR (acrylic rubber) latex, BR (polybutadiene rubber) latex, IIR (butyl rubber) latex, CR latex, IR latex, polysulfide rubber latex, and the like.

Examples of the synthetic resin latex include carboxy-modified NBR latex, carboxy-modified SBR latex, acrylic ester-based latex, styrene-butadiene-resin latex, a vinyl acetate latex, polyvinyl acetate latex, vinyl chloride latex, polyvinyl chloride latex, vinylidene chloride latex, polyvinylidene chloride latex, polystyrene latex, and the like.

Among those described above, when corrosiveness to tires or the like is considered, it is more preferable to use a synthetic rubber latex or a synthetic resin latex, and it is more preferable to use one kind or two or more kinds selected from the group consisting of SBR latex, NBR latex, MBR latex, BR latex, carboxy-modified NBR latex, and carboxy-modified SBR latex.

A one kind of the rubber latex may be used, or two or more kinds may be mixed and used.

The content of the rubber latex is preferably from 10% by mass to 90% by mass, more preferably from 20% by mass to 70% by mass, and even more preferably from 25% by mass to 50% by mass, with respect to the total mass of the puncture-sealing agent.

(3) Third Mixing Process

The third mixing process is a process of mixing the mixture liquid A2 with a tackifier.

When the mixture liquid A2 is mixed with a tackifier, it is preferable to perform stirring, and the stirring speed is preferably from 50 to 500 rpm.

The tackifier mainly improves the adhesive power, to a tire, of a synthetic rubber or a synthetic resin, which is a solid component of the latex.

The tackifier is not particularly limited as long as the effects of the invention are not impaired, and for example, a resin tackifier can be preferably used.

Examples of the resin tackifier include a natural resin, modified rosin and a derivative of modified rosin, a terpene resin and a terpene modification products, an aliphatic hydrocarbon resin, a cyclopentadiene resin; an aromatic petroleum resin, a phenolic resin, an alkylphenol acetylene resin, a styrene resin, a xylene resin, a coumarone-indene resin, and a vinyltoluene-α methylstyrene copolymers.

Examples of the natural resin include rosin, dammar, and the like.

Examples of the modified rosin and the derivative of modified resin include polymerized rosin (for example, a rosin acid ester resin and the like), a partially hydrogenated rosin, and the like.

Examples of the terpene resin and the terpene modification product include pinene; a terpene phenolic resin such as an α-pinene phenolic resin, a dipentene phenolic resin, a terpene bisphenolic resin, or the like, and a hydrogenation product thereof, and the like.

Examples of the aliphatic hydrocarbon resin include olefin, a olefin polymer, and the like.

Furthermore, an acrylic tackifier, a water-soluble tackifier and the like can also be used.

Among them, it is preferable to use a terpene phenolic resin or a rosin acid ester resin, from the viewpoints that the tackifier does not tend to conglomerate the latex and that the adhesiveness of the solid component of the latex to the tire is excellent.

In consideration of miscibility with the latex and improvement of puncture sealability, the tackifier is preferably used in a tackifier emulsion, and it is preferable to use a tackifier that is compatible with the latex. In the tackifier emulsion, a known surfactant (preferably, a nonionic surfactant) is used as an emulsifier, and a rosin acid ester resin, a terpene resin such as a terpene phenolic resin or the like, or a butyl rubber material such as polyisobutylene or the like can be used as a resin component.

Here, the tackifier emulsion being "compatible" to the latex means that the tackifier emulsion does not conglomerate the latex at all, and indicate that the tackifier emulsion is used to improve the adhesive power of the latex to the tire. For example, the resin is added to an elastomer as a tackiness imparting agent for a rubber film and can be used.

When the tackifier is used in the tackifier emulsion, the content of the tackifier emulsion in the puncture-sealing agent is preferably from 1% by mass to 15% by mass, more preferably from 2% by mass to 12% by mass, and even more preferably from 3% by mass to 9% by mass, with respect to the total mass of the puncture-sealing agent. When the content is from 1% by mass to 15% by mass, practical and good sealability can be exerted.

The total solid content in the puncture-sealing agent is preferably from 5% by mass to 70% by mass, more preferably from 5% by mass to 60% by mass, and even more preferably from 8% by mass to 40% by mass, with respect to the total mass of the puncture-sealing agent.

The "total solid content" can be determined in the following manner. First, 10 g of a puncture-sealing agent is left to stand in a condition of 140° C. for 4 hours. The total solid content can be determined by measuring the mass of the residual portion after the standing, and dividing the mass of the residual part by the mass of the puncture-sealing agent (mass of residual part/mass of puncture-sealing agent prior to standing).

When the total solid content is 5% by mass or greater with respect to the total mass of the puncture-sealing agent, sufficient sealability can be secured. Furthermore, when the total solids content is 70% by mass or less, characteristics in addition other than sealability can be sufficiently secured.

As in the first to third mixing processes, when the rubber latex, the antifreeze liquid and the tackifier are mixed in a specific combination of mixing processes, it is possible that the rubber latex which is most important for exerting sealability is stabilized (with respect to long-term storage) in an aqueous system, gelification of the sealing agent caused by the rubber latex agglomerate is effectively prevented, and the productivity of the puncture-sealing agent is improved.

According to the invention, a filtration process or an agglomerate growth process may be provided as necessary, after the third mixing process. Hereinafter, the respective processes are described.

Filtration Process

The filtration process is a process of filtering, as necessary, the mixture liquid obtained in the third mixing process. As the filtration method, a known method can be employed. Depending on the preparation conditions, there are some cases in which gelification due to agglomeration of the rubber latex proceeds after performing the mixing processes described above, and an microparticulate aggregate is generated. When the aggregate is left as it is, this serves as a nucleus and gelification further proceeds, in some cases. Thus, it is preferable to remove, through the filtration process, the microparticulate aggregate that serves as a nucleus, and finally, to effectively prevent the gelification of the sealing agent cause by the rubber latex agglomerate. As a result, the storage stability of the puncture-sealing agent can also be improved.

For a filter member for the filtering device used in filtration, it is preferable to use a mesh filter which is made of metal and formed into a wire mesh shape. In this case, it is preferable to use a filter having a mesh number of from 50 meshes (the aperture diameter of the mesh being about 300 µm) to 400 meshes (the aperture diameter of the mesh being about 30 µm). As the material for the mesh filter, a metallic material having high corrosion resistance such as stainless steel, an aluminum alloy, or the like can be preferably used.

Furthermore, as the filter member, a porous filter in which a large number of fine openings having substantially the same aperture diameter as the mesh of a mesh filter of 50 meshes to 400 meshes are perforated may be used, or a superposed filter in which mesh filters or porous filters are superposed may also be used.

Agglomerate Growth Process

Prior to the filtration process, it is preferable to provide an agglomerate growth process. In this agglomerate growth process, a neat liquid of the sealing agent prepared in the mixing processes is stored (left to stand still) in a vessel for a still-standing time of at least 24 hours or longer and preferably 48 hours or longer, without being stirred. The lower limit of the still-standing time can be appropriately changed within the range of from 24 hours to 48 hours in accordance with the mesh number of the mesh filter used in the filtration process or the like.

The upper limit of the still-standing time is not particularly limited. However, in consideration of restrictions on the process time (tact time) when the puncture-sealing agent is manufactured, limitations on the stock amount to stock the manufactured puncture-sealing agent, and the like, and in consideration of the changes in the amount of water during storage since the amount of water contained in the puncture-sealing agent gradually changes in accordance with the storage environment by evaporation or moisture absorption, it is preferable to set the upper limit of the still-standing time for 480 hours or less.

In the respective processes described above, the following components may be appropriately added.

Short Fibers

Short fibers function that penetrate into a hole and a puncture (defect part) that occur in the tire by puncture to cause clogging, thereby rapidly and definitely plugging the hole or the puncture.

The content of the short fibers is preferably from 0.1% by mass to 5% by mass with respect to the total mass of the puncture-sealing agent. When the content is 0.1% by mass or greater, the sealability can be sufficiently exerted by addition of the short fibers, ands when the content is 5% by mass or less, entanglement of the short fibers can be prevented, the viscosity does not tend to increase, and the ease of injection of the puncture-sealing agent is improved, and at the same time, while the role of the puncture-sealing agent previously described tends to be exerted sufficiently.

The content of the short fibers is preferably from 0.3% by mass to 4% by mass, and more preferably from 0.5% by mass to 3% by mass, with respect to the total mass of the puncture-sealing agent.

Regarding the puncture-sealing agent, in order to sufficiently exert such a role described above, it is necessary to adopt various designs for the short fibers. Thus, it is preferable that the specific gravity (S), length (L), diameter (D), and the ratio of length and diameter (L/D) of the short fibers are in the following ranges, respectively.

(1) Specific gravity (S): $0.8 \leq S \leq 1.4$ (more preferably, $0.9 \leq S \leq 1.3$ and even more preferably $1.0 \leq S \leq 1.2$).

When the specific gravity is less than 0.8, the short fibers float on the puncture-sealing agent, and the long-term separation stability is decreased in some cases, in some cases, and in the case of greater than 1.4, the short fibers sink down in the puncture-sealing agent and the long-term separation stability is decreased in some cases.

(2) Length (L): $0.05 \leq L \leq 10$ mm (more preferably $0.08 \leq L \leq 8$ mm, and even more preferably $0.1 \leq L \leq 6$ mm).

When the length is less than 0.05 mm, the short fibers cause clogging at the defect part caused by puncture, and the effect of improving sealability can not be sufficiently exerted in some cases, and in the case of greater than 10 mm, the relative number of the short fibers decreases, and thus sealability is decreased, in some cases.

(3) Diameter (D): $1 \leq D \leq 100$ µm (more preferably $3 \leq D \leq 80$ µm, and even more preferably $5 \leq D \leq 50$ µm).

When the diameter (thickness) is less than 1 µm, the role of the short fibers causing clogging to improve sealability as described above can not sufficiently be exerted in some cases, and in the case of greater than 100 µm, the relative number of the short fibers decreases, and thus sealability is decreased, in some cases.

(4) Ratio of length and diameter (L/D): $5 \leq L/D \leq 2000$ (more preferably 20 L/D 1600, even more preferably $50 \leq L/D \leq 1200$, and particularly preferably $100 \leq L/D \leq 300$).

When the ratio L/D is less than 5, the role of the short fibers causing clogging to improve sealability as described above can not sufficiently be exerted in some cases, and in the case of greater than 2000, lumps are generated as a result of entanglement of the short fibers, and thus decrease in sealability and ease of injection occurs in some cases.

Furthermore, short fibers which are formed of a single material in a specific shape can be used, however short fibers which are formed from plural materials in various shapes can also be used within the scope described above.

The material of the short fiber is not particularly limited, however it is preferable that the short fibers are formed of any of polyester, polyethylene, nylon, polypropylene, and a complex of two or more of these, and it is even more preferable that the short fibers are formed of any of polyethylene, nylon, polypropylene, and a complex of two or more of these. When such short fibers are used, better separation stability is obtained.

It is preferable to treat the entire amount or a portion (preferably, the entire amount) of the short fibers with a solvent such as a higher alcohol derivative and/or a betaine active agent, or the like. Such a treatment can improve the dispersibility of the short fibers.

The treatment may be before or after incorporating the short fibers to the puncture-sealing agent. A treatment method can be carried out by impregnating the short fibers with the solvent, or by spraying the solvent. The higher alcohol derivative is preferably a polyglycol-based polyester, or the like.

The addition amount of the solvent (amount absorbed by the short fibers as a result of the treatment) is preferably from 0.2% by mass to 20% by mass, more preferably from 0.5% by mass to 10% by mass, and even more preferably from 1% by mass to 6% by mass, with respect to the mass of the short fibers. When the addition amount is in the range described above, a sufficient dispersion effect of the short fibers is obtained, the treatment works well, and an improvement of the effects can be expected.

Filler

Furthermore, one or more kinds of fillers may also be incorporated into the puncture-sealing agent so that sealing can be rapidly performed, and even a large hole can be reliably sealed. As stable fillers, for example, silicic acid, chalk, carbon black, a synthetic resin reinforced with glass fiber, polystyrene particles, powdered rubber obtained by pulverization of a vulcanization product such as a tire or the like, sawdust, moss rubber particles, foamed particles for cut flowers, a rubber powder conjugated with silicic acid, and the like can be employed. Among these, the particularly preferred filler is a rubber powder conjugated with silicic acid and a synthetic resin reinforced with glass fiber.

The filler can be directly added into the puncture-sealing agent. However, as long as the filler has a size that is difficult or impossible to guide the puncture-sealing agent via a valve without changing the valve size, such a filler is introduced into the inside of a tire when a rim of the tire is generally assembled, and sealing is accomplished as the puncture-sealing agent is injected when a puncture occurs in the tire.

The filler is added to the puncture-sealing agent or is disposed inside of a tire during tire rim assembly, in an amount of preferably from about 20 g/liter to 200 g/liter, and more preferably 60 g/liter to 100 g/liter, with respect to the puncture-sealing agent.

Other Additives

A conventional dispersant, an emulsifier, a foam stabilizer, and a pH adjusting agent such as caustic soda may further be added, and if necessary, a liquid resin emulsion may also be used.

In the invention, the puncture sealing agent can be manufactured according to another exemplary embodiment.

A second exemplary embodiment of the invention is a method of manufacturing a puncture-sealing agent including a first mixing process of mixing a synthetic rubber latex with a tackifier to obtain a mixture liquid B1; a second mixing process of mixing an antifreeze liquid with water to obtain a mixture liquid B2; a third mixing process of adding the mixture liquid B2 dropwise into the mixture liquid B1 that is being stirred and performing mixing to obtain a mixture liquid B3, while increasing the stirring speed as the liquid amount of the mixture liquid B3 increases.

The second exemplary embodiment is similar to the first exemplary embodiment, except that the mixing order of the respective components is different from that of the first exemplary embodiment.

That is, the rate of dropwise addition of the mixture liquid B2 is the same as the rate of dropwise addition of the mixture liquid A1, and so is the preferred range. Furthermore, the stirring speed of the mixture liquid B3 increases in accordance with the liquid amount of the mixture liquid B3 similar to the stirring speed of the mixture liquid A2. It is preferable that the amount of variation in the stirring speed of the mixture liquid B3 is constant and the amount of variation in the stirring speed of the mixture liquid B3 is preferably in the range of from 0.1 rpm/mm to 6.0 rpm/mm. The stirring speed of the mixture liquid B3 may be increased as needed as the liquid amount of the mixture liquid B3 increases, or may be increased fixed volume increments or fixed liquid depth increments.

Furthermore, it is also similar to the first exemplary embodiment in that a filtration process or an agglomerate growth process can be appropriately provided.

As in the second exemplary embodiment described above, by mixing the tackifier with the latex in advance (mixture liquid B1) and mixing the mixture liquid B1 with a mixture liquid of an antifreeze liquid and water (mixture liquid B2) in the method of manufacturing a puncture-sealing agent, destabilization of the puncture-sealing agent caused by rubber latex agglomerates is prevented, whereby the productivity of the puncture-sealing agent can be improved.

Also in the second exemplary embodiment of the invention, the preferred ranges of the stirring speed, the dropwise-addition rate, and the ratio of the antifreeze liquid a and water b (a/b) as explained in the first exemplary embodiment of the invention can be preferably applied.

Furthermore, regardless of the exemplary embodiment, the manufacturing, storage and filling of the puncture-sealing agent are preferably carried out in the atmosphere of nitrogen or a rare gas, in order to avoid oxidation and the like.

Viscosity of Puncture-sealing Agent

The viscosity of the puncture-sealing agent is, under a condition that is assumed to be an actual use condition (at least, prior to filling in a tire, and in the range of from 60° C. to −60° C.), preferably from 3 mPa·s to 20,000 mPa·s, more preferably from 5 mPa·s to 4,500 mPa·s, even more preferably from 8 mPa·s to 3,000 mP·s, particularly preferably from 10 to 3,000 mPa·s, and most preferably from 15 to 1,500 mPa·s.

When the viscosity of the puncture-sealing agent is 3 mPa·s or greater, liquid leakage at the time of injection into a valve can be prevented. When the viscosity is 20,000 mPa·s or less, a decrease in the ease of injection can be prevented since resistance at the time of injection can be suppressed, and since spread over the inner surface of the tire can be sufficiently carried out, high sealability can be obtained.

Furthermore, the solidification point can be further decreased by containing an antifreeze liquid in the puncture-sealing agent as described above, and when a monohydric alcohol is used as the antifreeze liquid, the puncture-sealing agent with low viscosity can be preferably used even in such an extremely cold place as at −40° C. or lower. The viscosity of the puncture-sealing agent at −40° C. is preferably from 3 mPa·s to 5,000 mPa·s, more preferably from 10 mPa·s to 3,000 mPa·s, and particularly preferably from 10 mPa·s to 2,000 mPa·s.

The viscosity of the puncture-sealing agent can be measured with a B type viscometer or the like.

Method of Repairing Puncture with Puncture-sealing Agent

As the method of repairing a puncture with the puncture-sealing agent as described above, known methods may be applied. That is, first, a container filled with a puncture-sealing agent is inserted into a valve opening of a tire to inject an appropriate amount. Thereafter, the tire may be rotated such that the puncture-sealing agent spreads over the inner surface of the tire to seal a puncture hole.

This kind of puncture-sealing agent itself may be introduced into the inside of a tire using various pump-up devices; for example, a spray containing a propane-butane mixture gas as a fuel gas to enable re-expansion of the tire. However, the puncture-sealing agent can be more preferably used with a pump-up device 20 shown in FIG. 1.

In the pump-up device 20 shown in FIG. 1, a small-sized air compressor 1 is used as the pressure source. This air compressor 1 is connected to a gas introduction unit 3 in a pressure resistant container 4 through a hose 2. The gas introduction unit 3 can be stopped by a plug valve 5, and is formed as a riser tube which extends above a liquid surface of a puncture-sealing agent 6 housed in the pressure resistant container 4.

Furthermore, the pressure resistant container 4 has an outlet valve 7 for ejecting the puncture-sealing agent 6. This outlet valve 7 is connected with one end of a hose 8, and at the same time, a screw adaptor 9 which is threadably connected to a tire valve 10 is mounted on the other end of the hose 8.

The pressure resistant container 4 has a filling stub 12, and is equipped with a jacket 11 filled with water. If necessary, calcium chloride as a heat source can be loaded in the filling stub 12. When the puncture-sealing agent 6 freezes at a low temperature, the puncture-sealing agent 6 is heated to a possible use temperature by the heat released by hydration of this heat source.

The air compressor 1 is connected to an electric cable 13, and its plug 14 is inserted into, for example, a cigarette lighter.

When a puncture occurs in a tire, the screw adaptor 9 is threadably connected to the tire valve 10, and while the air compressor 1 is connected to the cigarette lighter, the plug valve 5 in the gas introduction unit 3 of the pressure resistant container 4 is opened. Then, compressed air that is introduced from the air compressor 1 to the pressure resistant container 4 through the gas introduction unit 3 extrudes the puncture-sealing agent 6 from the outlet valve 7 and introduces the puncture-sealing agent 6 through the tire valve 10 into the inside of the tire. Thereafter, air is refilled into the tire and expands the tire to a specific internal pressure. When this is completed, the screw adaptor 9 is detached from the tire valve 10, and the air compressor 1 is stopped. Immediately after this, a preliminary run is performed for a certain distance, and as the puncture-sealing agent 6 is spread out inside the tire, the puncture hole is sealed. Subsequently, the pump-up device 20 is re-connected and pumps up the tire again to the required internal pressure.

Figure 2A:
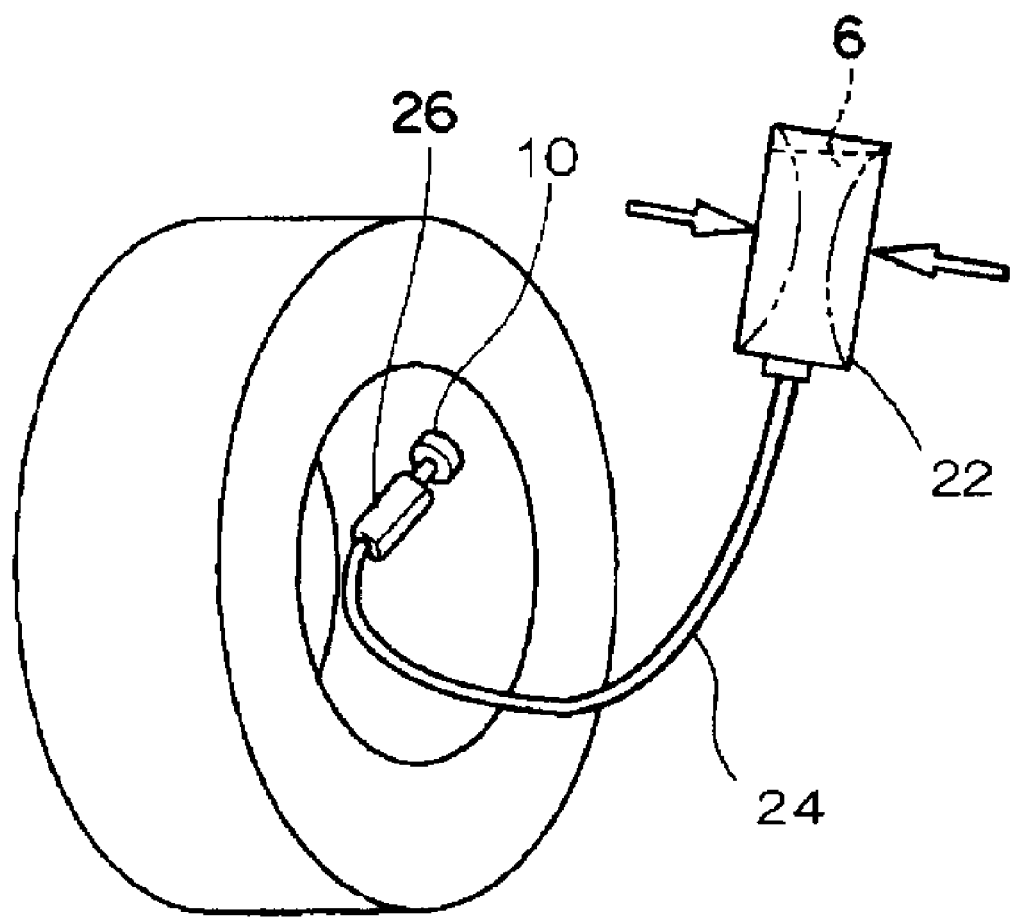
FIG. 2A is a schematic diagram showing a usage example of a bottle, which is a storage container for a puncture-sealing agent, in another example of the sealing-and-pump-up device used to fill a tire with a puncture-sealing agent according to another exemplary embodiment of the invention.
Figure 2B:
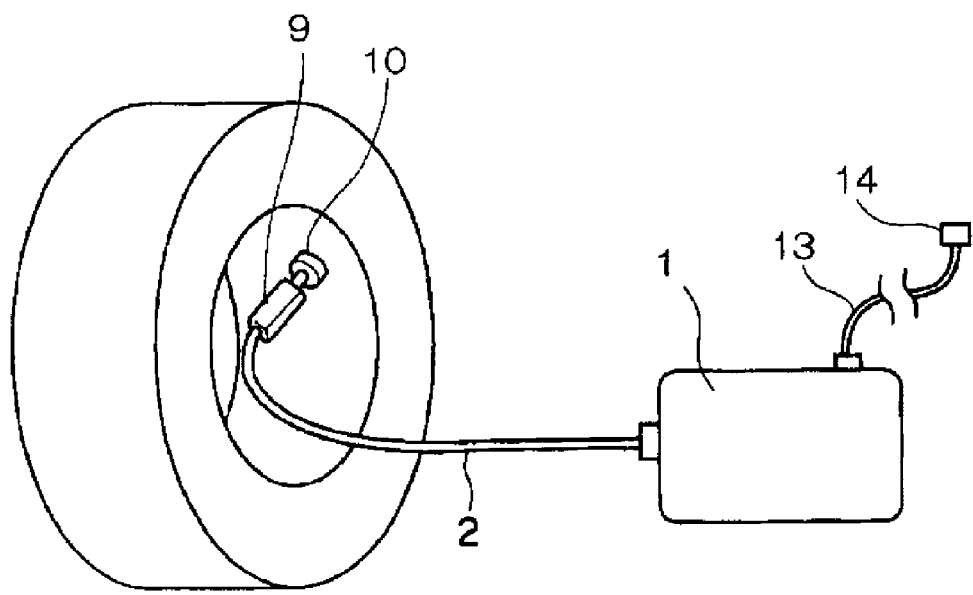
FIG. 2B is a schematic diagram showing a usage example of an air compressor in the other example of the sealing-and-pump-up device used to fill a tire with a puncture-sealing agent according to the other exemplary embodiment of the invention.

The puncture-sealing agent of the invention can also be used more preferably with the pump-up device shown in FIG. 2A and FIG. 2B. With regard to the pump-up device shown in FIG. 2A and FIG. 2B, those parts that are common to the pump-up device 20 shown in FIG. 1 have been assigned with the same reference numerals and explanation thereof is omitted.

This pump-up device is equipped with a bottle 22 made of a resin, which is a storage container for the puncture-sealing agent 6, as shown in FIG. 2A, and an air compressor 1 as a pressure source as shown in FIG. 2B. The bottle 22 stores the puncture-sealing agent 6 necessary for a single repair of a puncture. The bottle 22 is connected to a hose 24 having an adaptor 26 is placed at the end part thereof. Furthermore, in the hose 2 that is connected to the air compressor 1, an adaptor 9 is also placed at the end part thereof. However, in the hose 24 of the bottle 22, the adaptor 26 may be omitted when it is possible to make a direct connection to the tire valve 10.

When a puncture occurs, the adaptor 26 of the bottle 22 is threadably connected to the tire valve 10. Thereby, the hose 24 is in communication with the interior of the tire through the adaptor 26. In this condition, an operator crushes the bottle 22 to squeeze out the puncture-sealing agent 6 from the inside of the bottle 22 as shown in FIG. 2A with a dotted line (imaginary line), thereby injecting the puncture-sealing agent 6 into the tire through the hose 24.

When the injection of the puncture-sealing agent 6 into the tire from the bottle 22 is completed, the operator detaches the adaptor 26 from the tire valve 10 to detach the bottle 22 from the tire.

Subsequently, the operator threadably connects the adaptor 9 of the air compressor 1 to the tire valve 10, and communicates the air compressor 1 with the interior of the tire via the adaptor 9 and the hose 2. In this condition, the operator operates the air compressor 1 to refill pressurized air into the tire, and expands the tire to a specific internal pressure. When this is completed, the operator detaches the adaptor 9 from the tire valve 10, and stops the air compressor 1. Immediately after this, a preliminary run is performed for a certain distance, and as puncture-sealing agent 6 is spread out inside the tire, the puncture hole is sealed. The air compressor 1 as the pump-up device is re-connected by the operator who pumps up the tire again to the required internal pressure.

The puncture-sealing agent of the invention can be applied to the puncture repair of various air-filled tires. Examples include a tire for an automobile, a tire for a two-wheeled vehicle, a tire for a one-wheeled vehicle, a tire for a wheelchair, a tire for a vehicle used in an agricultural operation or a horticultural operation, and the like.

EXAMPLES

Hereinafter, the invention is specifically described in more detail by way of Examples, however the invention is not intended to be limited to these.

Comparative Examples 1 to 4 and Examples 1 to 10

First Mixing Process

A mixture liquid A1 was prepared by mixing the components of the following composition A1.

| Composition A1 | |
| --- | --- |
| Antifreeze liquid (Propylene glycol) | 45 parts by mass |
| Water | 15 parts by mass |

Second Mixing Process

The mixture liquid A1 thus obtained was added dropwise at a dropwise-addition rate indicated in the following Table 1, to 30 parts by mass of an SBR latex 30 which was being stirred at a stirring speed indicated in the following Table 1, and thus a mixture liquid A2 was obtained.

In addition, in Example 1 to Example 10 in which the stirring speed was variable, the stirring speed was increased with the increase in the mixture liquid A2 due to the dropwise addition of the mixture liquid A1.

Third Mixing Process 10 parts by mass of a tackifier (rosin acid ester emulsion) was added to the mixture liquid A2 thus obtained, and thus a puncture-sealing agent was prepared.

Evaluation

1. Time Taken for Uniform Dispersion

Under the manufacturing conditions indicated in the following Table 1, a water-soluble red ink was added dropwise into the latex, and the resultant was visually observed until the latex turned totally red. After the initiation of the dropwise addition of the water-soluble red ink, the time taken until the latex turned totally red was evaluated as the time taken for uniform dispersion of the liquid added dropwise. The evaluation criteria are as follows.

Evaluation Criteria

A: Uniform dispersion was achieved within 1 minute.

B: Uniform dispersion was achieved in a time of from longer than 1 minute to within 3 minutes.

C: It took longer than 3 minutes until uniform dispersion was achieved.

B: The amount of gel generated was more than 0.1% by mass and 1% by mass or less with respect to the total of the puncture-sealing agent.

C: The amount of gel generated was more than 1% by mass with respect to the total of the puncture-sealing agent.

4. Thermal Stability

The puncture-sealing agent thus manufactured was placed in a tightly-closed container, and the tightly-closed container was stored in an oven at 80° C. Subsequently, the nature of the puncture-sealing agent was observed. The evaluation criteria were as follows.

Evaluation Criteria

A: After storage for two months at 80° C., there was no change in nature.

B: After storage for one month at 80° C., there was no change in nature, however after storage for two months at 80° C., changes in nature (cream/gel generation) were observed.

C: Within one month of storage at 80° C., changes in nature (cream/gel generation) were observed.

TABLE 1

| | | | Comparative Example | | | | Example | | | | | | | | | |
|---|---|---|---|---|---|---|---|---|---|---|---|---|---|---|---|---|
| | | | 1 | 2 | 3 | 4 | 1 | 2 | 3 | 4 | 5 | 6 | 7 | 8 | 9 | 10 |
| Manufacturing conditions | Dropwise-addition rate | 1 | yes | yes | yes | yes | yes | yes | yes | yes | | | | | | |
| | | 0.5 | | | | | | | | | yes | | | | | |
| | | 5 | | | | | | | | | | yes | | | | |
| | | 10 | | | | | | | | | | | yes | | | |
| | | 100 | | | | | | | | | | | | yes | | |
| | | 300 | | | | | | | | | | | | | yes | |
| | | 500 | | | | | | | | | | | | | | yes |
| | Stirring speed Fixed | 500 | yes | | | | | | | | | | | | | |
| | | 250 | | yes | | | | | | | | | | | | |
| | | 100 | | | yes | | | | | | | | | | | |
| | | 50 | | | | yes | | | | | | | | | | |
| | Variable | 0.1 | | | | | yes | | | | | | | | | |
| | | 0.2 | | | | | | yes | | | yes | yes | yes | yes | yes | yes |
| | | 1.5 | | | | | | | yes | | | | | | | |
| | | 6.0 | | | | | | | | yes | | | | | | |
| Evaluation | Time taken for uniform dispersion | | A | A | C | C | B | A | A | A | A | A | A | A | A | A |
| | Foamability | | C | B | A | A | A | A | A | B | A | A | A | A | A | B |
| | Amount of gel generated | | C | B | A | A | A | A | A | B | A | A | A | A | A | B |
| | Thermal stability | | C | C | A | A | A | A | A | B | A | A | A | A | B | B |

Example 1 to Example 8 were evaluated at 250 rpm, as the final stirring speed.

2. Evaluation of Foamability

The amount of foam generated on the liquid surface when the mixture liquid A1 was added dropwise to the latex which was being stirred, was visually examined, and the ratio of an area E covered with foam and an area F of the entire liquid surface (E/F) was calculated. The evaluation criteria are as follows.

Evaluation Criteria

A: Almost no foam was formed.

B: The ratio E/F was 20% or less.

C: The ratio E/F was more than 20%.

3. Evaluation of Amount of Generated Gel

A gel generated in the mixture liquid A2 which was obtained by adding dropwise the mixture liquid A1 into the latex to perform mixing, was collected by filtering the mixture liquid A2 by a 200-mesh filter, and the amount of gel generated in the mixture liquid A2 was calculated. The evaluation criteria are as follows.

Evaluation Criteria

A: The amount of gel generated was 0.1% by mass or less with respect to the total of the puncture-sealing agent.

In Table 1 shown above, the unit of the "dropwise-addition rate" is [kg/min], the unit of the "stirring speed (fixed)" is [rpm], and the unit of the "stirring speed (variable)" is [rpm/mm].

From the results of Table 1, it is understood that the amount of gel generated in the puncture-sealing agent obtainable according to the manufacturing conditions of the Examples was small, and also that the puncture-sealing agent was excellent in thermal stability (storage stability).

The invention claimed is:

1. A method of manufacturing a puncture-sealing agent, the method comprising:
   a first mixing process of mixing an antifreeze liquid with water to obtain a mixture liquid A1;
   a second mixing process of adding the mixture liquid A1 dropwise into a rubber latex that is being stirred and performing mixing to obtain a mixture liquid A2, while increasing stirring speed as a liquid amount of the mixture liquid A2 increases; and
   a third mixing process of mixing the mixture liquid A2 with a tackifier.

2. The method of manufacturing a puncture-sealing agent according to claim 1, wherein a dropwise-addition rate of the mixture liquid A1 is from 0.5 kg/min to 500 kg/min.

3. The method of manufacturing a puncture-sealing agent according to claim 1, wherein a dropwise-addition rate of the mixture liquid A1 is from 0.5 kg/min to 100 kg/min.

4. The method of manufacturing a puncture-sealing agent according to claim 1, wherein when an amount of the antifreeze liquid is a and an amount of water is b, a ratio a/b is from 0.05 to 9.0 in mass ratio.

5. The method of manufacturing a puncture-sealing agent according to claim 1, wherein stirring is performed at a stirring speed of from 50 rpm to 500 rpm in the third mixing process.

6. The method of manufacturing a puncture-sealing agent according to claim 1, wherein the antifreeze liquid is a monohydric alcohol having a carbon number of 1 to 5 or a dihydric alcohol having a carbon number of 1 to 5.

7. The method of manufacturing a puncture-sealing agent according to claim 1, wherein the tackifier is a resin tackifier.

* * * * *